(12) United States Patent
Boegli

(10) Patent No.: US 8,038,922 B2
(45) Date of Patent: Oct. 18, 2011

(54) METHOD AND DEVICE FOR THE AUTHENTICATION OF IDENTIFICATION MARKS ON A PACKAGING FOIL OR PACKAGE

(75) Inventor: Charles Boegli, Marin (CH)

(73) Assignee: Boegli-Gravures S.A., Marin (CH)

( * ) Notice: Subject to any disclaimer, the term of this patent is extended or adjusted under 35 U.S.C. 154(b) by 376 days.

(21) Appl. No.: 11/797,980

(22) Filed: May 9, 2007

(65) Prior Publication Data

US 2007/0289701 A1 Dec. 20, 2007

(30) Foreign Application Priority Data

Jun. 15, 2006 (CH) ........................................ 0977/06
Jul. 6, 2006 (CH) ........................................ 1086/06

(51) Int. Cl.
*B29C 59/04* (2006.01)
(52) U.S. Cl. .................... 264/284; 156/209; 156/553
(58) Field of Classification Search .............. 264/284; 156/209, 284

See application file for complete search history.

(56) References Cited

U.S. PATENT DOCUMENTS 6,665,998 B1 12/2003 Boegli
7,036,347 B2 5/2006 Boegli
2004/0151796 A1 8/2004 Boegli
2005/0280182 A1 12/2005 Boegli
2006/0023280 A1* 2/2006 Mossberg ...................... 359/15

FOREIGN PATENT DOCUMENTS

| EP | 0 847 926 A1 | 6/1998 |
|---|---|---|
| EP | 1 437 213 A1 | 7/2004 |
| EP | 1 236 192 B1 | 3/2005 |
| JP | 2003-104355 A | 4/2003 |

* cited by examiner

*Primary Examiner* — Yogendra Gupta
*Assistant Examiner* — Robert J Grun
(74) *Attorney, Agent, or Firm* — Foley & Lardner LLP

(57) ABSTRACT

In the method for the authentication of identification features that are embossed on a packaging foil together with satin-finishing and the embossing of logos, a number of identification features is embossed on-line as a pattern and read by a suitable apparatus and evaluated by means of an image evaluation method.

Figure 1:
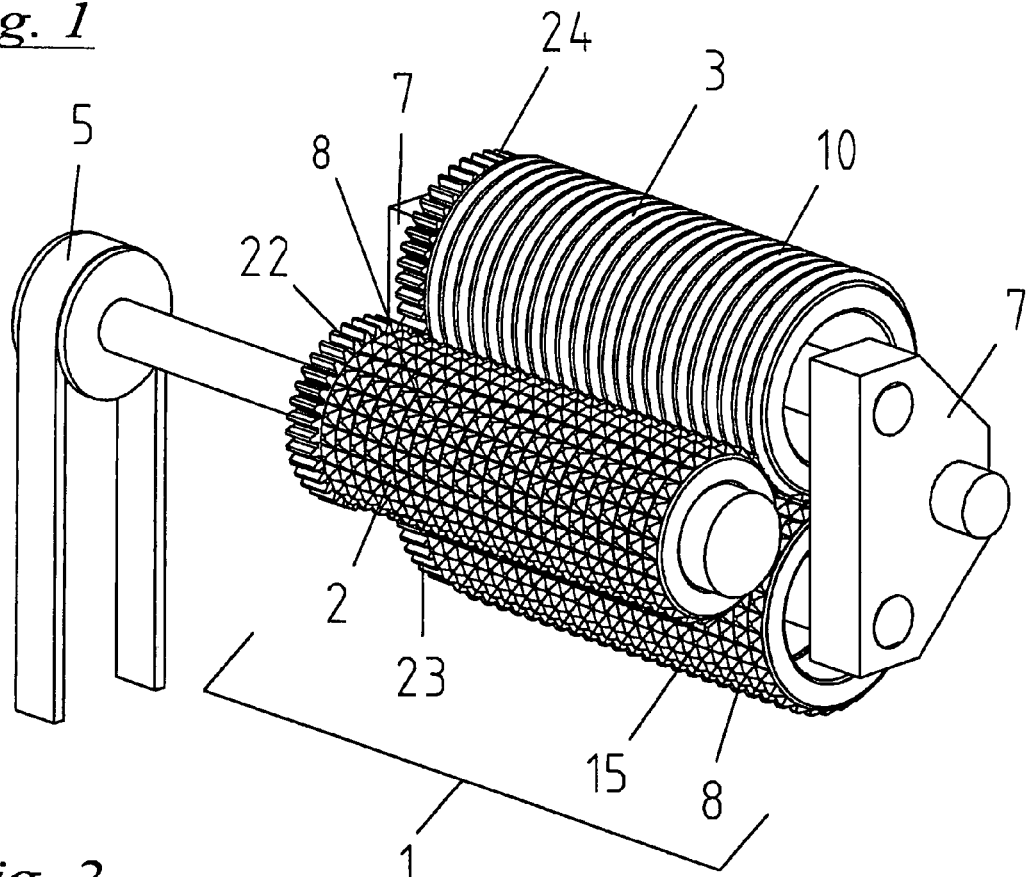

The embossing device (1) suitable therefor includes at least two embossing rollers (2, 3, 15), a reading unit, and an evaluating unit, one of the embossing rollers (2) being driven by the motor drive mechanism (5) and having individual teeth (8) of which a number of teeth for embossing identification features have a different shape, height, or surface structure while the remaining teeth serve for satin-finishing, and one of the mating rollers (3) being provided with circumferential rings (10). Such a method and such a device allow a relatively simpler embossing device with relatively lower requirements with regard to the embossing quality than in methods of the prior art.

9 Claims, 6 Drawing Sheets

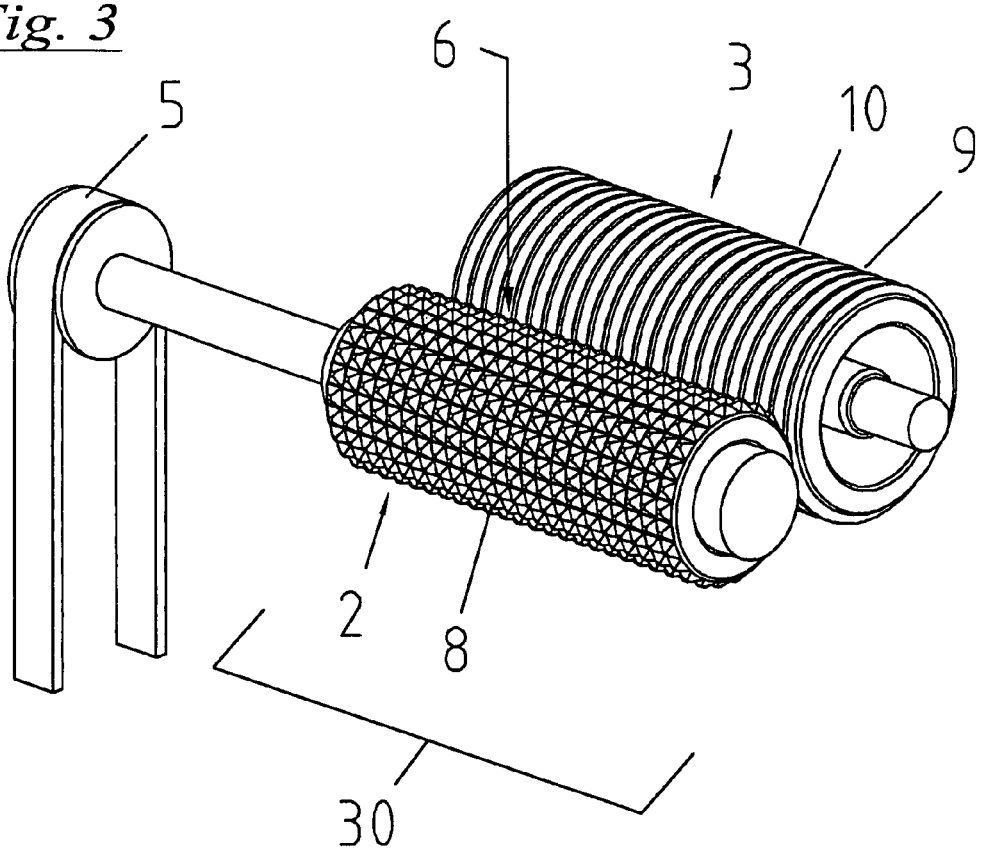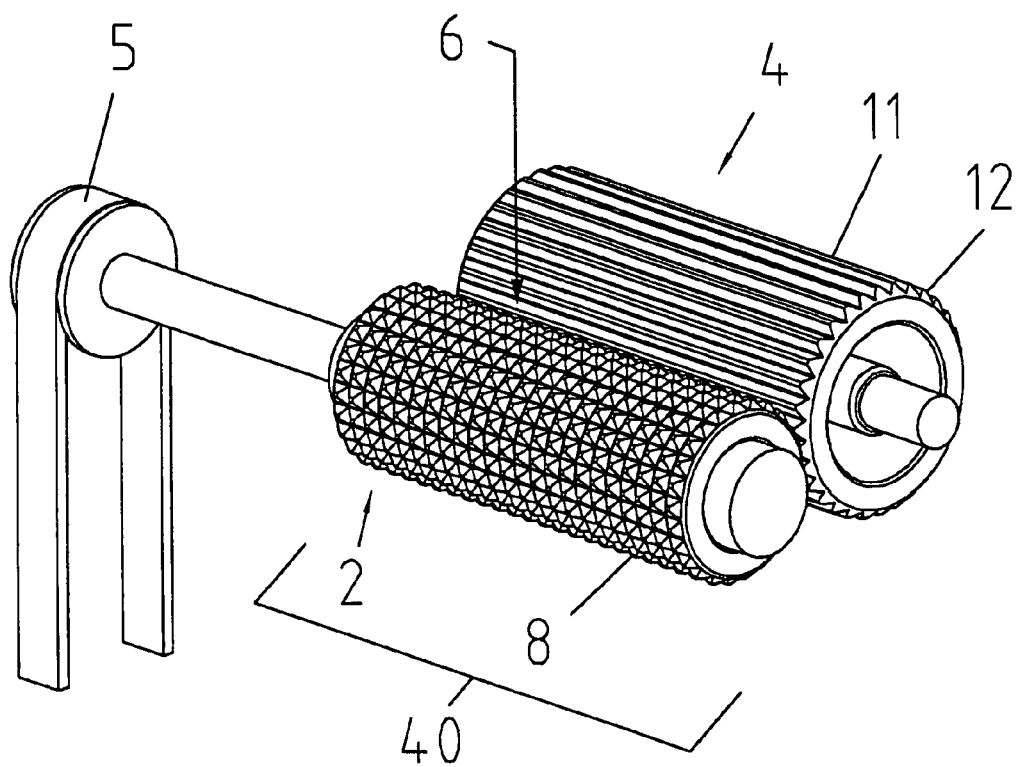

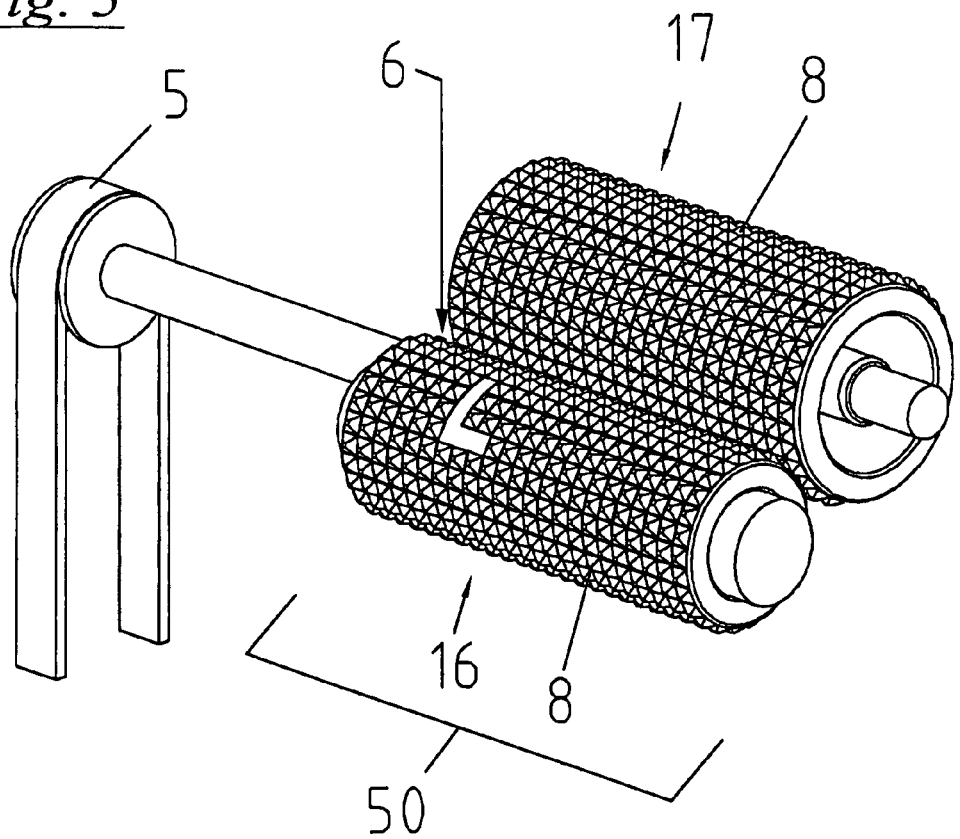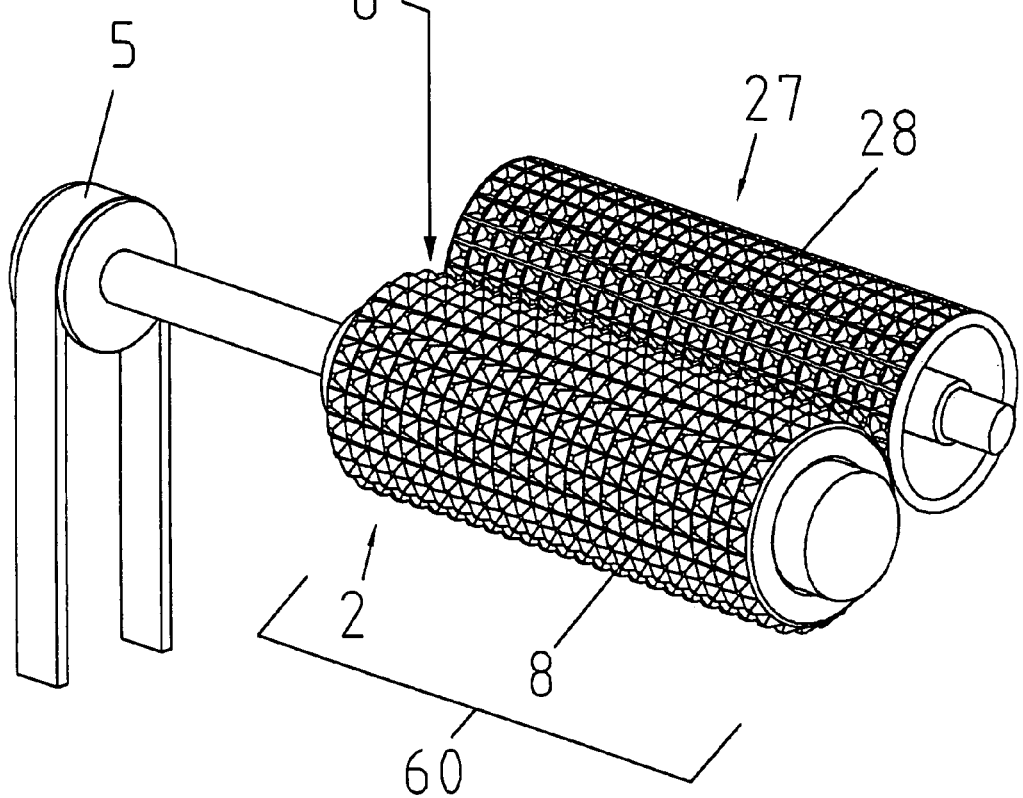

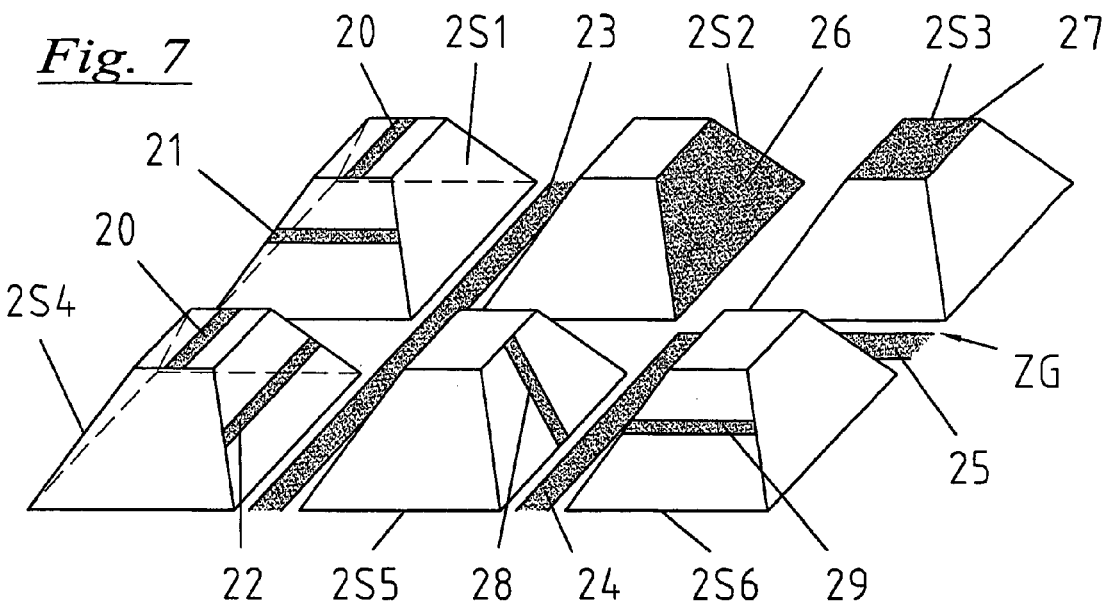
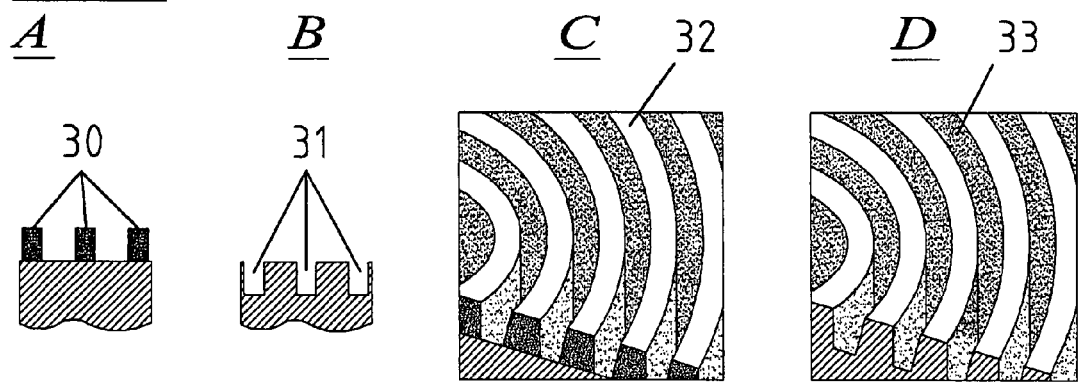
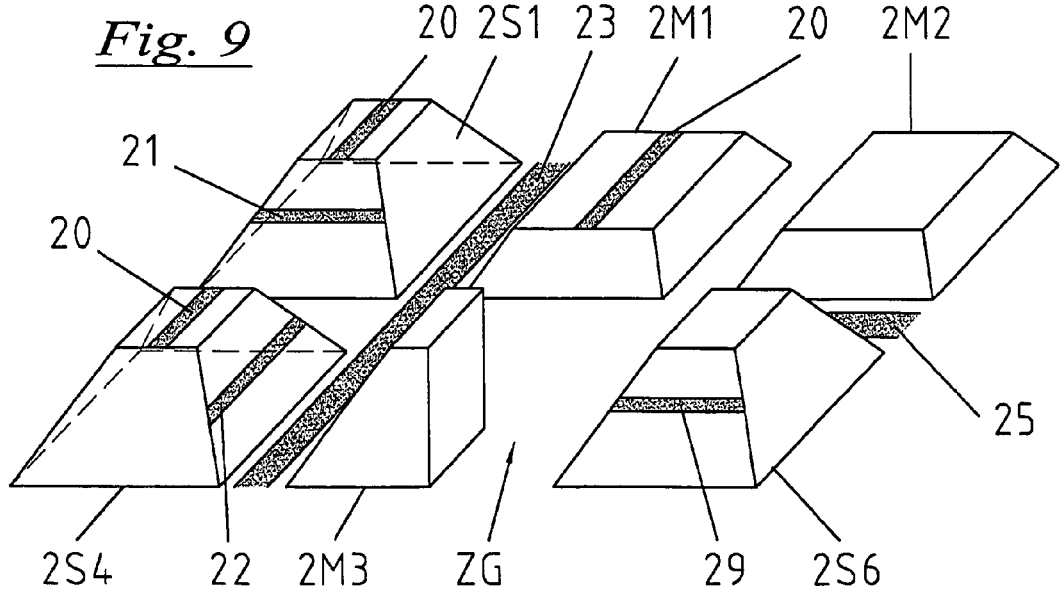

METHOD AND DEVICE FOR THE AUTHENTICATION OF IDENTIFICATION MARKS ON A PACKAGING FOIL OR PACKAGE

The present invention relates to a method and device for the authentication of identification features that are embossed on a package or packaging foil by means of embossing rollers on-line with satin-finishing. Such a method is known from EP-B1-1 236 192 to the applicant of the present invention where a special embossing is simultaneously produced by the embossing rollers during satin-finishing that creates a shadow effect and whose brightness varies according to the viewing angle.

From WO-02/30661 and EP-A-1 437 213, also to the applicant of the present invention, devices for embossing and simultaneously satin-finishing flat materials are known wherein individual teeth are machined to produce embossed marks in these locations whose appearance varies according to the viewing angle of the observer.

In the anterior patent applications to the applicant of the present invention, packaging foils having a thickness of approx. 30 μm to 70 μm have been addressed that are either manufactured from metal, e.g. aluminum, or consist of a paper or plastic film provided with a thin metal layer or having a very thin metal layer sprayed on. Accordingly, satin-finishing was defined as the act of providing the metal side of the foil with small, regularly arranged impressions in order to produce the satin appearance. Generally, for this purpose, interpenetrating rollers with pyramidal teeth are used which are arranged in the so-called pinup-pinup configuration.

However, within the scope of the present invention, purely synthetic foils e.g. of polypropylene or polybutene can furthermore be used whose surface is provided with fine, regular impressions in order to produce a satin effect here also. For this purpose, the rollers need not necessarily comprise the above-mentioned pyramidal teeth but other arrangements such as rings or longitudinal ridges may be provided, or elevations on otherwise smooth rollers. Normally, these rollers are steel rollers in order to produce the contact pressure and the required accuracy.

Within the scope of this patent application, the term "simultaneously" is widened to include the term "on-line". In the specifications of the prior art, the term "simultaneously" means satin-finishing and embossing marks in the same embossing station that consists of two or of several simultaneously driven rollers, this procedure being performed on-line with the production of packaged objects in a packaging line. The latter term designates a transport path along which cigarettes or similar goods are manufactured, bundled, and packaged. However, it may also be appropriate to perform the satin-finishing and the embossing of signs in two distinct embossing stations that are arranged one after the other and thus also operate on-line. In the context of the present application, the term "on-line" refers to the embossing procedure and not to the entire packaging line.

Furthermore, the term "embossing" designates the three-dimensional deformation of the surface of a foil, in contrast to printing, where inks are applied to the surface without deforming it. However, in addition to being embossed, the surface of the foil may also be printed. On the background of this prior art, it is an object of the present invention to improve the disclosed general inventive idea, i.e. the embossing of identification features for authentication purposes along with satin-finishing, in the sense of the above definitions of foils, of satin-finishing, and of embossing in such a manner that identification features relating to the content of the package or of the packaging foils, or to the manufacture, or to other objects, may be produced with a comparatively lower embossing quality and authenticated easily and automatically. This is accomplished by the method as defined in claim 1. The device for implementing the method is defined in claim 7.

Embodiments and further advantageous characteristic features are described in the dependent claims.

The invention will be explained in more detail hereinafter with reference to drawings of exemplary embodiments.

Figure 10:
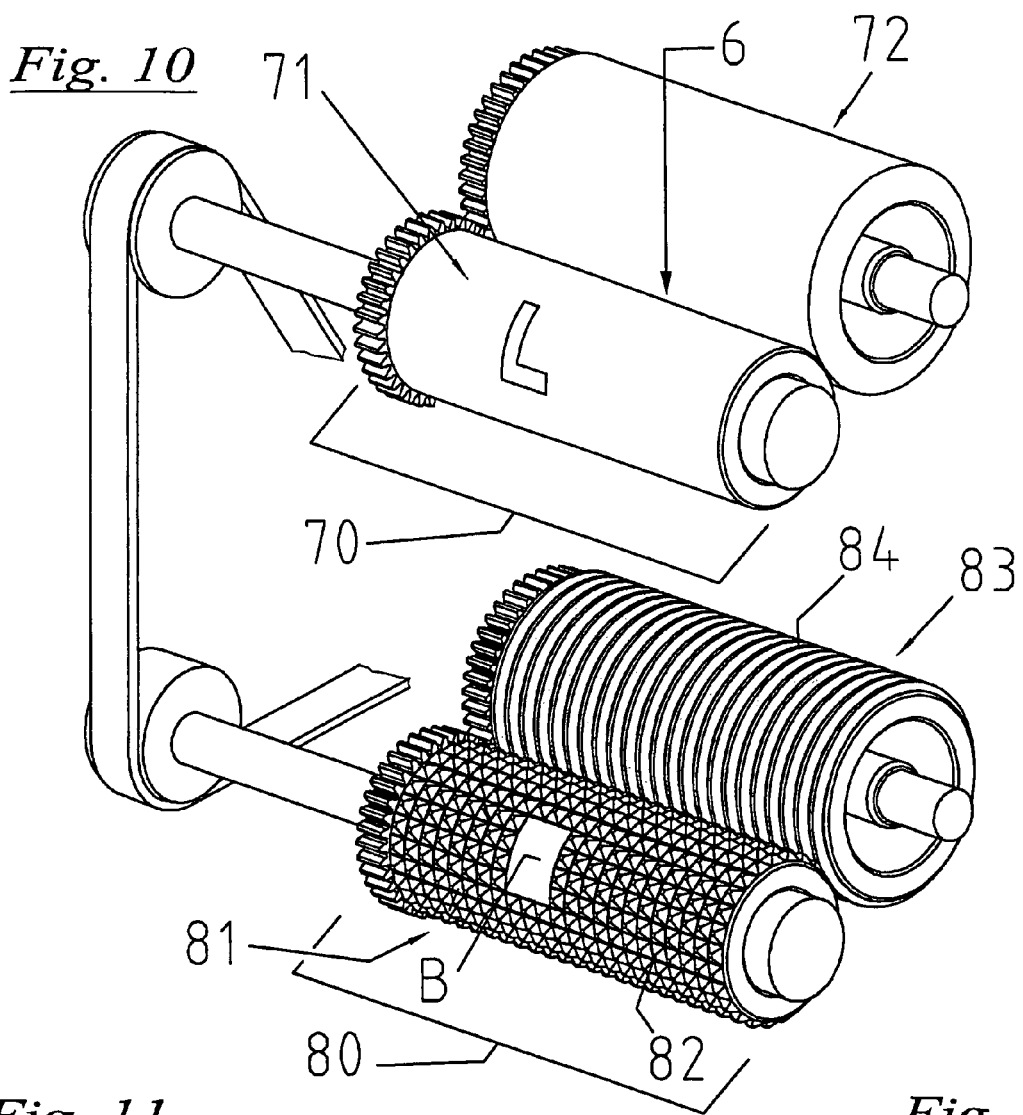

FIGS. 1-6 show exemplary embodiments of an embossing device for carrying out the method, FIG. 7 shows an enlarged detail with teeth having microstructures, FIG. 8 shows different possible microstructures of the tooth surface of FIG. 7 on a further enlarged scale, FIG. 9 shows a variant of FIG. 7 with teeth having macrostructures and microstructures provided on the teeth, FIG. 10 shows a possible arrangement of two roller pairs for satin-finishing, embossing logos, and embossing identification features.

Figure 11:
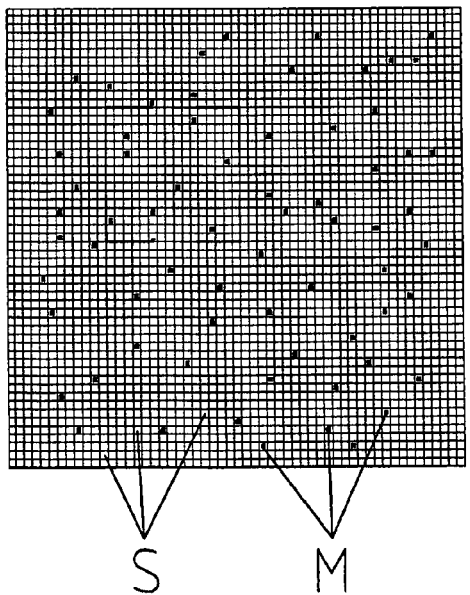
Figure 12:
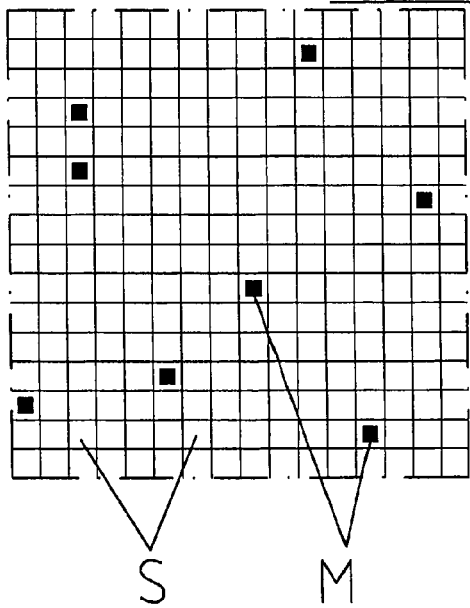
Figure 10A:
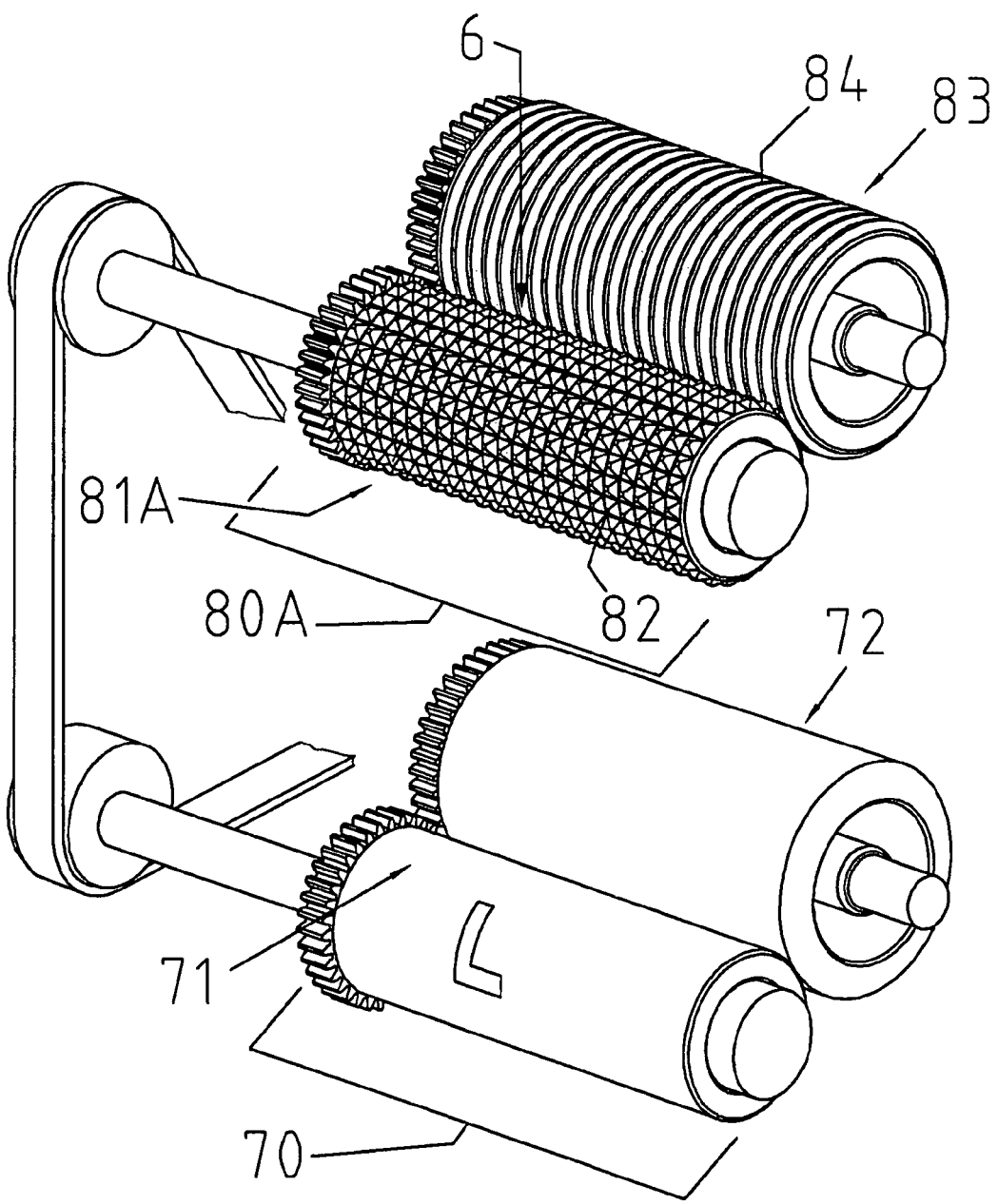

FIG. 10A shows a variant of the embodiment according to FIG. 10,

FIG. 11 schematically shows a possible arrangement of identification features, and FIG. 12 shows a detail of the arrangement of FIG. 10 on a strongly enlarged scale.

FIGS. 1-6 illustrate some embodiments of the devices as they are disclosed and described in WO-02/076716 to the applicant of the present invention. The embodiments that are not shown here are part of the disclosure in the present specification as well.

FIG. 1 shows a first exemplary embodiment of a device 1 having three embossing rollers, i.e. a first embossing roller 2 that cooperates with a second embossing roller 15 and a following embossing roller 3, first roller 2 being driven by a drive mechanism 5. The three embossing rollers are synchronized by means of gears 22-24.

As is symbolically indicated in FIG. 3 or 4, the medium 6 that is to be embossed, e.g. a packaging foil 6 that is metallized with a thin layer of 0.006 mm, is running in the vertical direction, i.e. from the top to the bottom of the figures, while the metallized layer is always facing the driven embossing roller.

The three embossing rollers do not have the same structure. First, driven embossing roller 2 comprises a number of teeth 8 in the form of truncated pyramids whose sides are parallel respectively perpendicular to the longitudinal axis of the embossing roller, as illustrated in FIG. 1.

Second embossing roller 15 has a toothing that is identical to that of first embossing roller 2, i.e. it is also provided with the teeth 8. This represents a so-called pinup-pinup configuration.

Third embossing roller 3 is provided with grooves 9 running around the entire circumference and arranged in parallel to each other such that teeth 8 of driven embossing roller 2 engage in the grooves. Rings 10 formed between grooves 9 are also outwardly tapered and flattened such that they engage between frustopyramidal teeth 8.

Figure 2:
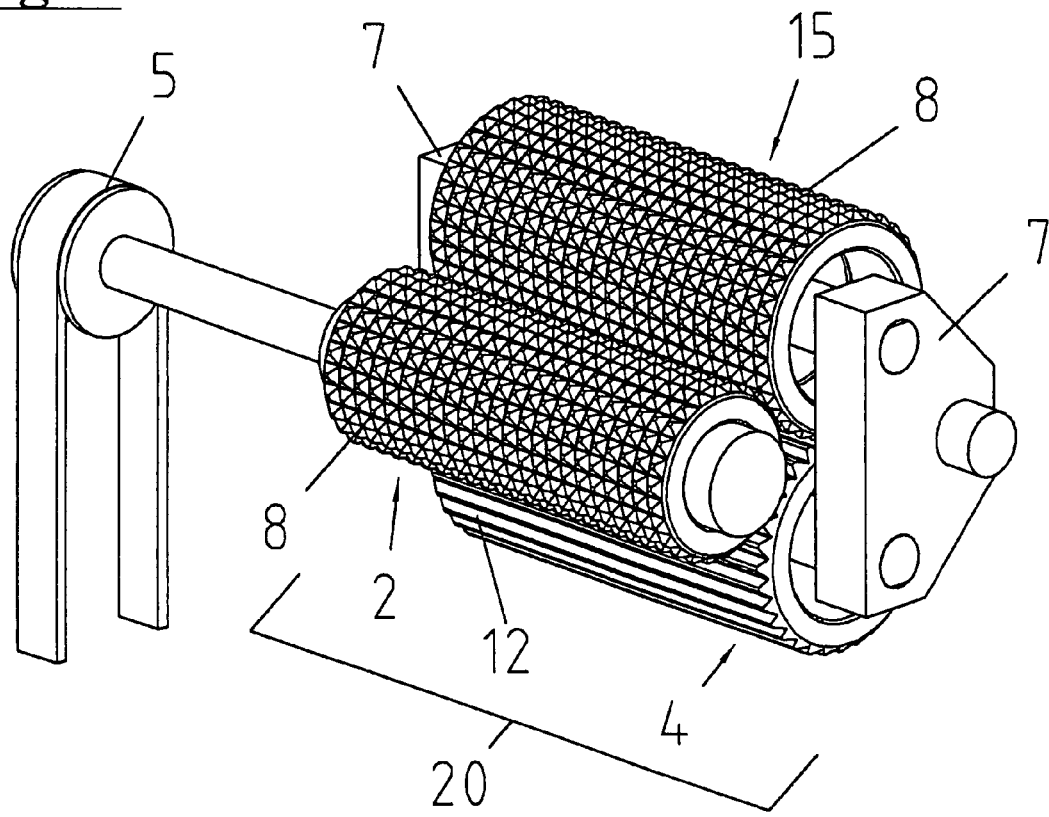

In device 20 according to FIG. 2, first embossing roller 2 and second embossing roller 15 are represented as having identical teeth 8. Third embossing roller 4 has longitudinal grooves 11 forming longitudinal ridges 12 between them that are also outwardly tapered and flattened like rings 10 in such a manner that longitudinal grooves 11 and the longitudinal ridges cooperate with teeth 8 of driven embossing roller 2.

In device 20, rather than being driven or synchronized with the driven roller by synchronizing elements such as gearwheels, for example, the two mating rollers 15 and 4 are driven by foil 6, see FIG. 3 or 4.

In FIGS. 3 and 4, devices 30 and 40 are merely composed of driven roller 2 with teeth 8 and roller 3 with rings 10 and grooves 9 or roller 4 with longitudinal ridges 12 and grooves 11.

FIG. 5 also shows a device 50 of the prior art having two embossing rollers 2 and 17 with teeth 8 in the pinup-pinup configuration where driven embossing roller 2 is provided with a logo, e.g. an "L". At the location of the latter, the corresponding teeth have been removed.

Device 60 of FIG. 6 includes driven embossing roller 2 with teeth 8 and a mating roller 27 having indentations 28 that are complementary to teeth 8, i.e. a pinup-pindown configuration. A potential logo would normally be provided on embossing roller 2.

The devices shown in FIGS. 1-6 are mutually combinable. Depending on the material of the packaging foil or package, it may be appropriate to use assemblies of two or three embossing rollers.

The production of logotypes, emblems and the like, hereinafter called logos, is e.g. realized by removing, shortening, or machining teeth on embossing roller 2 having teeth 8. The rings or longitudinal ridges, respectively, may affect the appearance of the embossing patterns produced by the embossing roller having teeth. By means of the embossing roller assemblies it is possible to produce logos and identification features by variations of teeth 8 or of rings 10 or of longitudinal ridges 12, i.e. by altering the height, the flanks, or the edges of the teeth, rings, or longitudinal ridges, or by applying patterns to their upper surfaces.

In FIG. 1 or 2 it is symbolically indicated that second and third embossing rollers 15 and 3 or 4 interlock with driven embossing roller 2, but this is not necessarily always the case. It is also conceivable that the second or the third embossing roller, respectively, only interlocks or is only capable of interlocking with the first or the preceding embossing roller, respectively. Furthermore it may be advantageous for certain applications to provide more than a total of three embossing rollers having different surface structures. Furthermore, both the diameter and the length of the individual rollers may differ. Also, in addition to the hard embossing rollers, soft counter-rollers may be used.

For the production of identification features, it may be advantageous to provide a forced synchronization of embossing rollers 2 and 15 having teeth 8 respectively indentations 28, as it is suggested in the embodiment of FIG. 1 by gearwheels 22-24, the latter being meant to generally represent synchronizing elements including other synchronizing means that are known in the art per se, such as electronic components and the like. A forced synchronization is also advisable particularly if the material is subject to strong warping in the embossing procedure. Depending on the type of material and/or the drive mechanism, such gearwheels may also be arranged on both sides of the rollers. Synchronized rollers are generally positioned highly accurately by suitable auxiliary means.

Embossing identification features means embossing marks, dots, patterns, and similar features for identification purposes that are produced on-line with satin-finishing and the embossing of logos. More specifically, these identification features may be located both in the satin-finished area and in the area of the logo(s) or on the logo itself, on the driven roller or on a mating roller. Satin-finishing may also be achieved by rollers having individual pins or needles, which are e.g. individually controlled, rather than individual teeth, in which case care must be taken that no through holes are created in the foil.

Preferably, for the present method, marks are used that are difficult to produce and easy to hide, e.g. in or next to other marks or next to surface defects, so that they are hardly noticeable.

In EP-A-1 163 061 to the applicant of the present invention, also included herein by reference, an embossing device is disclosed where at least one of the embossing rollers is contained in an interchangeable unit such that it is insertable in a bearing mount in a predetermined position. In the embodiment having at least three embossing rollers, the provision of interchangeable units for individual rollers or groups of rollers is particularly advantageous as the rationalization effect and the ecological advantages are particularly important in this case.

For the embossing of identification features, the methods and the devices according to EP-A-1 437 213 to the applicant of the present invention may e.g. be used which, as far as appropriate, are also considered as forming part of the disclosure. Among the different exemplary embodiments disclosed in this reference, those according to the figures numbered 5, 6, and 8 therein will be selected, i.e. FIGS. 7 to 9 in the present specification.

In FIGS. 7 to 9, a surface finish called "microstructure" herein of the individual teeth and of the tooth bottom of the driven embossing roller is illustrated. In FIG. 7, six teeth 2S1 to 2S6 are depicted whose microstructures are shown hatched. The teeth are frustopyramidal with a rectangular horizontal projection, the lateral edges extending in parallel respectively perpendicularly to the longitudinal axis of the roller, and the pyramids being flattened.

Tooth 2S1 has a microstructure 20 on the flattened portion of the tooth as well as a microstructure 21 on one or both transversal sides of the tooth, and tooth 2S4 has the same surface structure 20 and a microstructure 22 on one or both longitudinal side(s) of the tooth. Tooth bottom ZG may be provided with a microstructure 23 along the longitudinal side of the teeth or with a microstructure 24 extending over certain lengths or with a microstructure 25 extending transversally thereto.

Tooth 2S2 has a microstructure 26 that extends over the entire side on one or both of its longitudinal sides, and tooth 2S3 has a microstructure 27 that extends over the entire surface of its flattened portion. Teeth 2S5 and 2S6 only have a narrow microstructure 28 extending across the height of their longitudinal sides or a microstructure 29 extending along their transversal sides. In this manner, it is understood that a large variety of microstructures can be applied, thereby creating a correspondingly large variety of patterns on the foil.

In FIGS. 8A to 8D, some examples of possible straight or curved microstructures on top and on the sides of the teeth are indicated at a larger magnification. In FIG. 8A, a cross-section of a positive grid structure is illustrated, the individual ridges 30 being arranged at intervals of some µm. This structure may be used for any one of microstructures 20, 21, 28, or 29 and also on the tooth bottom, e.g. for microstructures 23, 24, or 25.

In FIG. 8B, a cross-section of a negative grid structure is schematically indicated, recesses 31 also being arranged at intervals of some 100 nm to some µm.

In FIG. 8C, a possible positive microstructure formed of grid-like, curved ridges 32 is schematically indicated in a perspective view.

In FIG. 8D, a possible negative microstructure formed of grid-like, curved grooves 33 is schematically indicated in a perspective view. This structure is e.g. appropriate for use in microstructure 24 or 25.

It becomes apparent from these few examples that a very large range of variation both of the microstructures, respectively of the arrangement of these microstructures on the individual teeth and on the tooth bottom or only on the tooth bottom alone, and of the kind of the microstructures themselves is possible. This depends on the current state of the art with regard to the production of such structures, the production of microstructures being also applied particularly in the manufacture of electronic chips and known from this field. In such fine microstructures, the application of suitable methods such as lacquer or etching techniques plays an important role.

The teeth of FIG. 9 are provided both with a macrostructure and a microstructure. In this regard, the term "macrostructure" designates a modification of the tooth geometry in teeth of some 10 μm up to 600 μm while the microstructure refers to the modification of the surfaces of the teeth.

FIG. 9 illustrates three geometrically unmodified teeth 2S1, 2S4, and 2S6, however with microstructures as in FIG. 7, as well as teeth 2M1, 2M2, and 2M3 where the "M" stands for macrostructure. Tooth 2M1 exhibits a greater amount of flattening than a regular tooth such as 2S1, the flattened portion being provided with a microstructure 20.

Tooth 2M2 only has a larger amount of flattening and is otherwise unmodified, whereas tooth 2M3 is cut in half in its width. Of course, teeth 2M2 and 2M3 may be provided with microstructures as well. Again, in the example according to FIG. 9, the tooth bottom may be machined and may have the same microstructure 23 as in FIG. 7 and a microstructure 25.

An even greater variety of possible modifications of teeth results from the illustration of FIG. 9, thereby providing a very large variety of embossing patterns. Alternatively, only the structures on the tooth bottom may be used for embossing alone.

In the pinup-pindown configuration, it is not only possible to make the indentations shallower, in analogy to the flattened teeth, but also to provide complementary macrostructures and/or microstructures in the indentations.

In FIG. 10, another possible embossing station is illustrated that consists of two roller pairs that are driven by the same drive mechanism while the pairs, i.e. the embossing stations, are each synchronized internally.

First embossing station 70 comprises two smooth metal rollers 71 and 72, first roller 71 being driven directly and provided on its surface with a raised embossing zone L. The symbol "L" stands for identification features of any kind that may be individual dots or marks or of a group of marks, dots, or the like. It is understood that several embossing zones may be provided on the roller too. Mating roller 72 is also made of metal, e.g. of steel, and has no surface structure.

Second embossing station 80 comprises two structured embossing rollers as they are known from EP-A-1 372 946, in this case a directly driven roller 81 having projecting teeth 82 and a roller 83 having rings 84, which are synchronized with one another or contained in a common enclosure. This second roller pair is intended for satin-finishing the foil according to the known state of the art and possibly providing it with a logo or a plurality of logos.

This means that the foil that is to be embossed is fed from a storage roll to the first roller assembly, the identification features are embossed, and then the foil passes to the second roller assembly. Care must be taken, however, that the identification features embossed in the first roller assembly are not impaired in the second roller assembly, and therefore, on driven roller 81, the teeth are removed at the location or locations where the embossed identification feature or features impinge on the roller so that the foil is not re-embossed in gap B.

In the embodiment variant according to FIG. 10A, foil 6 is first satin-finished in embossing station 80A and subsequently provided in second embossing station 70 with one or a plurality of identification feature(s) that are hidden in the satin-finished foil.

The embossing stations may have a common or a sequential drive mechanism or two drive mechanisms and may be arranged in one enclosure or in two enclosures.

Now, one of the inventive ideas is to produce, by means of the known devices having modified individual teeth, rings, or longitudinal ridges on embossing rollers or by providing suitable structures on an otherwise smooth roller, a particular arrangement of identification features represented by an array of dots, marks, or the like that can be recognized and thus identified in the authentication procedure. To this end, e.g. a checkerboard-like pattern or another reproducible pattern is produced by means of individual teeth, rings, longitudinal ridges, or suitable structures on an otherwise smooth roller that are modified according to a particular pattern, and in this array of dots deviating from the ordinary points that create the satin-finish, one or a plurality of defined geometrical areas are selected in which the array of identification features is authenticated.

In order to be able to establish a demarcation between the ordinary satin-finished dots and the modified ones, reference will be made to the term "satin-finishing" as it has been defined in the introduction.

With regard to the packaging materials, reference will be made to the introduction of the description as well. The so-called inliners, i.e. the packaging foils that are wrapped around objects to be packaged like cigarettes and either consist of metal foils or of metallized foils, have the following properties:

They serve as elegant packaging materials, they may not contract, curl, or twist in the transversal direction because of the resulting folds and consequent disturbances in the following packaging machines, the mat optical effect is achieved by embossing small indentations that reflect the light diffusely.

The size of the elevations is chosen such that they are hardly visible as such by the eye. Generally, elevations are produced at intervals smaller than 0.5 mm. The height of the elevations is therefore coarsely half this value, i.e. smaller than 0.25 mm.

The plastic foils are the so-called wrappers that are wrapped around containers such as cigarette packets. These foils, which may be single or multilayer foils, are provided with identification features and satin-finished in the same embossing roller assemblies and may also be provided with logos. The identification features and/or logos may also be embossed holograms.

Preferably, within the limits of satin-finishing specified above, one or several arrays of dots or similar marks are embossed by modified teeth, rings, or ridges or the like, and a certain number of marks in a previously defined area or in several areas thereof are selected by electronic means in order to relate and compare them to the arrays, patterns, or specifically arranged dots on the packaging foil or the packaging material by means of an image processing method.

FIG. 11 schematically illustrates a grid on a foil as it is obtained during satin-finishing, i.e. regularly arranged indentations S that have been created by the described methods and devices for satin-finishing. In addition, identification features M are created, i.e. differently designed indentations that have been created by the embossing of microstructures. FIG. 12 shows an enlarged detail of FIG. 11.

In a possible exemplary embodiment of the method, the surface of a packaging foil provided with identification features is captured by a camera, the term "camera" comprising all kinds of cameras including e.g. CCD cameras and the like. However, the method of the invention also allows other imaging methods. In order to perform a comparison of the template having a specific pattern, e.g. a checkerboard-like template, with the image recorded by the camera, an image processing technique based on so-called template matching is applied.

The foil that serves as the transmission medium may exhibit production and usage defects. In order still to allow a safe extraction of the hidden identification features, the latter are provided with redundancy, i.e. an additional coding that is adapted to the transmission channel is performed. This redundant coding subsequently allows a safe extraction of the identification feature during the reading procedure, thereby providing an increased authentication reliability. To this end, the identification features are extracted by means of a decoding method and compared to the original information.

The statistic relationship between the marks of the template and those of the embossed identification feature determined by this method is used as a measure of the similarity between the template and the embossed pattern and therefore forms the basis of the decision regarding authenticity. In practice it has been found that an authentication that is sufficiently safe for many purposes can be achieved by empirically specifying a minimum level of the processing signal against noise.

The reliable and quick authentication, hitherto impossible to achieve, of identification features in the satin-finished area or in the logo zone that are invisible or only barely visible by the eye, may be refined by alternative methods used in automatic image processing and known to those skilled in the art, such as e.g. gray scale correlation, and by the application of suitable software algorithms.

According to the invention, reading of the patterns may also be achieved directly through the outer packaging e.g. of cardboard by means of optical imaging devices using daylight a spectrally appropriate lighting source. To this end, the wavelength of the lighting source should be selected such that the radiation is reflected by the metallic side of the packaging foil while passing through the remaining parts of the package.

All these image processing methods have in common that a specified pattern is produced in a specified area on a template and this template serves both for producing the corresponding pattern on the embossing roller—through the modification of teeth, etc.—and for determining the degree of similarity of the produced foil and of the template.

The selection of an area facilitates or accelerates the method, respectively, but it is not always required. Moreover, in the suggested method, relatively simple modifications on the teeth are sufficient as the detection of differences in brightness on the reflecting embossed materials is principally utilized.

Furthermore, due to the easy electronic detection of the object that is to be authenticated, a quick and reliable examination thereof is also possible from a distance by remote inquiry.

Based on the methods described above, it may be advantageous to combine the latter with other authentication methods that are known in the art per se if an even higher degree of safety is required.

The invention claimed is:

1. A method for authenticating identification marks embossed on a packaging foil or a package together with satining or satining and embossing of logos, comprising: creating a template that includes the identification marks, wherein the identification marks comprise one or more of arrays and patterns of dots; producing a roll according to the template; embossing the identification marks on-line as a pattern on the packaging foil; reading the embossed identification marks using a suitable apparatus; decoding the embossed identification marks; selecting a predetermined amount of decoded, embossed identification marks using a suitable apparatus; recording an image of the selected identification marks; and comparing the recorded identification marks to the template using an image processing device.

2. The method according to claim 1, wherein on the template, a specified area comprising identification marks is defined, this area is recognized on the image of the pattern that has been read, and the identification marks of both areas located therein are compared to each other.

3. The method according to claim 1, wherein the comparison is performed by a channel encoder/decoder.

4. The method according to claim 1, wherein the roll includes a plurality of embossing rolls or a smooth roll and wherein the template for the embossing rolls includes an array of identification marks that include teeth, rings, or longitudinal ridges.

5. The method according to claim 1, wherein the identification marks are located in the satined area or on logos or on one logo.

6. The method according to claim 1, further comprising: defining a specified area comprising identification marks; recognizing the specified area on the image of the pattern read during the reading step; comparing the identification marks of the specified area with the pattern created according to the machining embossing step.

7. The method according to claim 4, wherein on one embossing roll, the height of a single tooth or of a group of teeth is modified to produce an identification mark.

8. The method according to claim 1, wherein the roll includes a plurality of embossing rolls or a smooth roll and wherein the template for the embossing rolls includes an array of identification marks.

9. The method according to claim 1, wherein the identification marks further comprises holograms.

\* \* \* \* \*